US011927005B2

(12) United States Patent
Yao

(10) Patent No.: US 11,927,005 B2
(45) Date of Patent: Mar. 12, 2024

(54) CONNECTING STRUCTURE, NOZZLE ASSEMBLY, NOZZLE BRACKET, AND URINAL

(71) Applicant: Kohler (China) Investment Co., Ltd., Shanghai (CN)

(72) Inventor: Pingsheng Yao, Shanghai (CN)

(73) Assignee: Kohler (China) Investment Co., Ltd., Shanghai (CN)

( * ) Notice: Subject to any disclaimer, the term of this patent is extended or adjusted under 35 U.S.C. 154(b) by 240 days.

(21) Appl. No.: 17/313,117

(22) Filed: May 6, 2021

(65) Prior Publication Data

US 2021/0348376 A1 Nov. 11, 2021

(30) Foreign Application Priority Data

May 11, 2020 (CN) ........................ 202020766990.0
May 11, 2020 (CN) ........................ 202020776036.X

(51) Int. Cl.
*E03D 13/00* (2006.01)
*B05B 15/65* (2018.01)

(52) U.S. Cl.
CPC ............ *E03D 13/005* (2013.01); *B05B 15/65* (2018.02)

(58) Field of Classification Search
CPC ... E03D 13/00; E03D 13/005; A61H 33/6021; A61H 33/6063; B05B 15/65
See application file for complete search history.

(56) References Cited

U.S. PATENT DOCUMENTS 5,398,348 A * 3/1995 Tashiro .................. E03D 13/00
4/304
10,167,619 B2 * 1/2019 Yaoka ..................... E03D 13/00
10,245,599 B2 * 4/2019 Kosarnig ................ B05B 15/18

* cited by examiner

*Primary Examiner* — Janie M Loeppke
(74) *Attorney, Agent, or Firm* — Lempia Summerfield Katz LLC

(57) ABSTRACT

The present disclosure provides a connecting structure, a nozzle assembly, a nozzle bracket and a urinal. The connecting structure includes: a urinal bowl, wherein the urinal bowl includes a basin surface for receiving urine, a middle upper portion of the urinal bowl comprises an accommodating space, and the nozzle assembly is disposed in the accommodating space; the nozzle bracket is disposed in the accommodating space; the nozzle bracket is movably connected with the nozzle assembly; and the nozzle bracket has a locking structure. The connecting structure according to the present disclosure enables the nozzle assembly of the urinal to be replaced and maintained conveniently and quickly.

15 Claims, 13 Drawing Sheets

CONNECTING STRUCTURE, NOZZLE ASSEMBLY, NOZZLE BRACKET, AND URINAL

CROSS REFERENCE TO RELATED APPLICATION

This application claims the benefit of priority to: Chinese Patent Application No. 202020766990.0 filed in the Chinese Intellectual Property Office on May 11, 2020, which is hereby incorporated by reference in its entirety; Chinese Patent Application No. 202020776036.X filed in the Chinese Intellectual Property Office on May 11, 2020, which is hereby incorporated by reference in its entirety.

FIELD

The present disclosure relates to the technical field of sanitary apparatus, and more particularly, the present disclosure relates to a connecting structure, a nozzle assembly using the connecting structure, a nozzle bracket matched with the nozzle assembly, and a urinal using the connecting structure.

BACKGROUND

In a urinal, a nozzle or a nozzle assembly is arranged in a middle upper-portion of the urinal, and the nozzle sprays water into a urinal bowl for flushing the urinal bowl after going to the toilet. Thus, the nozzle needs to be connected with a water supply pipeline.

With the development of technology, urinals with sensors on nozzles have appeared. These sensors can sense a distance of an object or a user, so as to control automatic water discharge. These sensors may be infrared, ultrasonic or microwave sensors. In this way, a battery needs to be arranged on the nozzle of the urinal, and a processing unit and a circuit board also need to be arranged inside the nozzle of the urinal.

In a humid environment, electronic components, circuit lines and pipelines in the nozzle of the urinal will break down.

The nozzle of the urinal is directly locked on the urinal bowl, which is inconvenient for maintenance of the urinal bowl. In the case of replacing the battery or maintaining a circuit or waterway failure, it is very inconvenient, and the maintenance takes a long time, and the urinal cannot be used during the maintenance.

Therefore, it is necessary to design a urinal and a nozzle assembly which could be quickly and conveniently maintained.

SUMMARY

A technical problem to be solved by the present disclosure is to provide a connecting structure, which enables a nozzle assembly of a urinal to be replaced and maintained conveniently and quickly.

The present disclosure provides a connecting structure, including: a urinal bowl, wherein the urinal bowl is provided with a basin surface for taking urine, a middle upper portion of the urinal bowl is provided with an accommodating space, and the nozzle assembly is accommodated in the accommodating space; a nozzle bracket is arranged in the accommodating space; the nozzle bracket is movably connected with the nozzle assembly; and the nozzle bracket is provided with a locking structure.

The connecting structure according to the present disclosure has the beneficial effect that: the nozzle assembly of the urinal can be replaced and maintained conveniently and quickly.

In an embodiment, an inward end of the locking structure is provided with a steel ball, the steel ball is connected with a spring, and the other end of the spring is fixedly connected to the nozzle bracket; under a pressure of the spring, the steel ball protrudes towards the nozzle assembly by a set distance; and a clamping structure matched with the steel ball is arranged on a shell of the nozzle assembly.

In an embodiment, the locking structure is provided with a spring strip, and one end of the spring strip is fixedly connected to the nozzle bracket; and the other end of the spring strip abuts against the clamping structure on the shell of the nozzle assembly.

In an embodiment, the clamping structure on the shell of the nozzle assembly is a step structure.

In an embodiment, a plurality of groups of the locking structure are arranged symmetrically on the nozzle bracket.

The present disclosure further provides a nozzle assembly applied to a urinal, wherein the nozzle assembly is located in a middle upper portion of the urinal bowl to spit out cleaning water to a basin surface; the nozzle assembly is located in an accommodating space in the middle upper portion of the urinal bowl; and the nozzle assembly is movably connected with a nozzle bracket in the accommodating space.

The nozzle assembly according to the present disclosure has the beneficial effect that: the nozzle assembly of the urinal can be replaced and maintained conveniently and quickly.

In an embodiment, a step structure is arranged on a shell of the nozzle assembly, and the step structure is matched with a steel ball or a spring strip on the nozzle bracket to lock the nozzle assembly.

The present disclosure further provides a nozzle bracket applied to a urinal, wherein the nozzle assembly is located in a middle upper portion of the urinal bowl to spit out cleaning water to a basin surface; a nozzle assembly is movably connected in the nozzle bracket; and the nozzle bracket is provided with a locking structure.

The nozzle bracket according to the present disclosure has the beneficial effect that: the nozzle assembly of the urinal can be replaced and maintained conveniently and quickly.

In an embodiment, an inward end of the locking structure is provided with a steel ball, the steel ball is connected with a spring, and the other end of the spring is fixedly connected to the nozzle bracket; under a pressure of the spring, the steel ball protrudes towards the nozzle assembly by a set distance; and a clamping structure matched with the steel ball is arranged on a shell of the nozzle assembly.

In an embodiment, the locking structure is provided with a spring strip, and one end of the spring strip is fixedly connected to the nozzle bracket; and the other end of the spring strip abuts against the clamping structure on the shell of the nozzle assembly.

In an embodiment, a plurality of groups of the locking structure are arranged symmetrically on the nozzle bracket.

The present disclosure further provides a urinal, including: a urinal bowl, wherein the urinal bowl is provided with a basin surface for taking urine, a middle upper portion of the urinal bowl is provided with an accommodating space, and the nozzle assembly is accommodated in the accommodating space; a nozzle bracket is arranged in the accommodating space; the nozzle bracket is movably connected with the nozzle assembly; and the nozzle bracket is provided with a locking structure.

The urinal according to the present disclosure has the beneficial effect that: the nozzle assembly of the urinal can be replaced and maintained conveniently and quickly.

In an embodiment, an inward end of the locking structure is provided with a steel ball, the steel ball is connected with a spring, and the other end of the spring is fixedly connected to the nozzle bracket; under a pressure of the spring, the steel ball protrudes towards the nozzle assembly by a set distance; and a clamping structure matched with the steel ball is arranged on a shell of the nozzle assembly.

In an embodiment, the locking structure is provided with a spring strip, and one end of the spring strip is fixedly connected to the nozzle bracket; and the other end of the spring strip abuts against the clamping structure on the shell of the nozzle assembly.

In an embodiment, a plurality of groups of the locking structure are arranged symmetrically on the nozzle bracket; and the clamping structure on the shell of the nozzle assembly is a step structure.

Another technical problem to be solved by the present disclosure is to provide a nozzle assembly, which can be replaced and maintained conveniently and quickly.

The present disclosure provides a nozzle assembly, wherein the nozzle assembly is located in an accommodating space in a middle upper portion of a urinal, and the nozzle assembly is movably connected with the urinal through a nozzle bracket; and the nozzle assembly includes: a shell, wherein an electric control unit and/or a battery is arranged in the shell; and the shell is movably connected with the nozzle bracket through a locking structure.

The nozzle assembly according to the present disclosure has the beneficial effect that: the nozzle assembly becomes a whole with the battery and the electric control unit integrated inside, and the nozzle assembly is movably connected with the urinal, which can be replaced and maintained conveniently and quickly.

In an embodiment, the nozzle assembly is connected with a water pipe.

In an embodiment, a first cavity is arranged in the shell, and the electric control unit is accommodated in the first cavity; and the electric control unit is located in a case of the electric control unit, and the case of the electric control unit is movably connected with an inner wall of the shell; and/or, a second cavity is arranged in the shell, and the battery is accommodated in the second cavity; and the battery is located in a battery case, and the battery case is movably connected with the inner wall of the shell;

In an embodiment, a middle portion of the shell is provided with a channel for the water pipe to pass through; and the first cavity and the second cavity are symmetrically distributed on left and right sides of the water pipe.

In an embodiment, the water pipe is connected with the nozzle assembly through an elastic clamp.

In an embodiment, the electric control unit is inserted into the first cavity; and the battery is inserted into the second cavity.

In an embodiment, a step structure is arranged on the shell of the nozzle assembly, and the step structure is matched with a steel ball or a spring strip on the nozzle bracket to lock the nozzle assembly.

The present disclosure further provides a urinal, including: a urinal bowl, wherein the urinal bowl is provided with a basin surface for taking urine, a middle upper portion of the urinal bowl is provided with an accommodating space, and a nozzle assembly is accommodated in the accommodating space; a nozzle bracket is arranged in the accommodating space; the nozzle assembly includes a shell, and an electric control unit and/or a battery is arranged in the shell; and the nozzle assembly is movably connected with the nozzle bracket.

The urinal according to the present disclosure has the beneficial effect that: the nozzle assembly becomes a whole with the battery and the electric control unit integrated inside, and the nozzle assembly is movably connected with the urinal, which can be replaced and maintained conveniently and quickly.

In an embodiment, the nozzle assembly is connected with a water pipe; a first cavity is arranged in the shell, and the electric control unit is accommodated in the first cavity; and the electric control unit is located in a case of the electric control unit, and the case of the electric control unit is movably connected with an inner wall of the shell; and/or, a second cavity is arranged in the shell, and the battery is accommodated in the second cavity; and the battery is located in a battery case, and the battery case is movably connected with the inner wall of the shell;

In an embodiment, a middle portion of the shell is provided with a channel for the water pipe to pass through; and the first cavity and the second cavity are symmetrically distributed on left and right sides of the water pipe.

In an embodiment, the water pipe is connected with the nozzle assembly through an elastic clamp, the electric control unit is inserted into the first cavity; and the battery is inserted into the second cavity.

In an embodiment, the shell is movably connected with the nozzle bracket through a locking structure, an inward end of the locking structure is provided with a steel ball, the steel ball is connected with a spring, and the other end of the spring is fixedly connected to the nozzle bracket; under a pressure of the spring, the steel ball protrudes towards the nozzle assembly by a set distance; and a clamping structure matched with the steel ball is arranged on the shell of the nozzle assembly.

In an embodiment, the shell is movably connected with the nozzle bracket through a locking structure, the locking structure is provided with a spring strip, and one end of the spring strip is fixedly connected to the nozzle bracket; and the other end of the spring strip abuts against the clamping structure on the shell of the nozzle assembly.

In an embodiment, a plurality of groups of the locking structure are arranged symmetrically on the nozzle bracket; a step structure is arranged on the shell of the nozzle assembly, and the step structure is matched with the steel ball or the spring strip on the nozzle bracket to lock the nozzle assembly.

BRIEF DESCRIPTION OF THE FIGURES

In order to illustrate the technical solutions in the embodiments of the present disclosure more clearly, the drawings used in the description of the embodiments are briefly described below. Apparently, the drawings in the following description are merely some embodiments of the present disclosure. For those of ordinary skills in the art, other drawings may also be obtained based on these drawings without any creative work and should fall within the scope of protection of the present disclosure.

Figure 1:
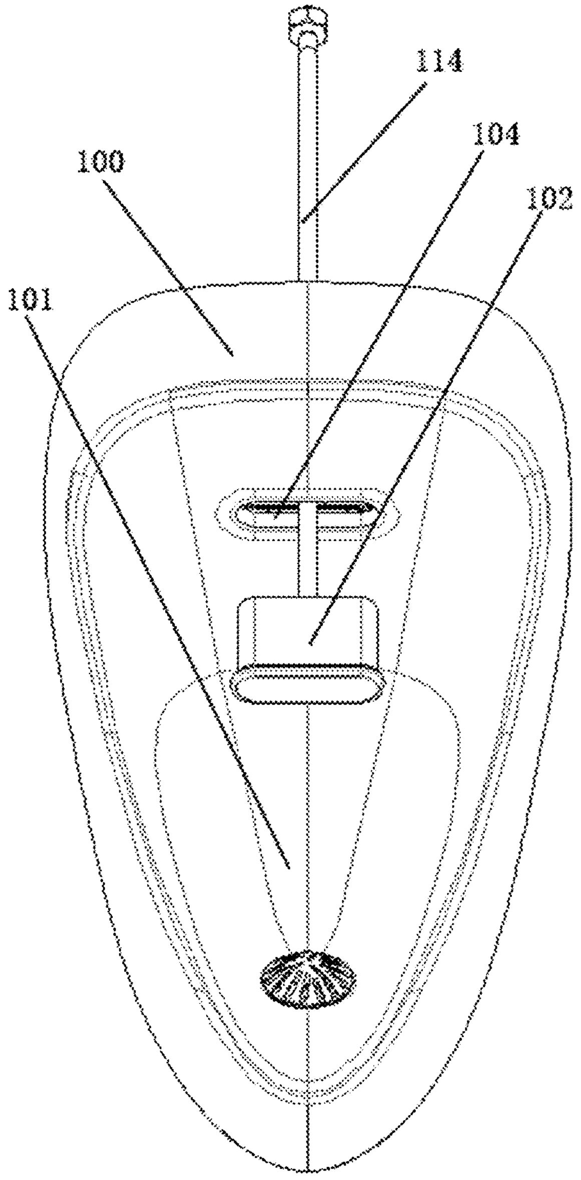
FIG. 1 is a schematic diagram of a connecting structure according to a first embodiment of the present disclosure.

DESCRIPTION OF REFERENCE NUMERALS urinal bowl 100, basin surface 101, nozzle assembly 102, nozzle bracket 103, accommodating space 104, electric control unit 105, battery 106, battery case 107, jig 108, locking structure 109, steel ball 110, spring 111, step structure 112, spring strip 113, water pipe 114, channel 115 for water pipe to pass through, clamp 116, first cavity 117, second cavity 118, and water inlet 119 of nozzle assembly.

DETAILED DESCRIPTION

To make those skilled in the art to better understand the solutions in the present disclosure, the technical solutions in the embodiments of the present disclosure are be clearly and completely described hereinafter with reference to the drawings in the embodiments of the present disclosure. It should be apparent that the described embodiments are merely some rather than all embodiments of the present disclosure. Based on the embodiments of the present disclosure, all other embodiments obtained by those having ordinary skills in the art without going through any creative work should fall within the scope of protection of the present disclosure.

The terms “first”, “second”, “third” and the like in the specification, claims and drawings of the present disclosure are used to distinguish different objects, and are not used to describe a specific sequence. Furthermore, those terms “including” and “provided with” and any variations thereof are intended to cover non-exclusive inclusion. For example, processes, methods, apparatuses, products, or devices including a series of steps or units are not limited to the listed steps or units, but optionally include steps or units not listed, or optionally include other steps or units inherent to these processes, methods, products, or devices.

First Embodiment

Figure 2:
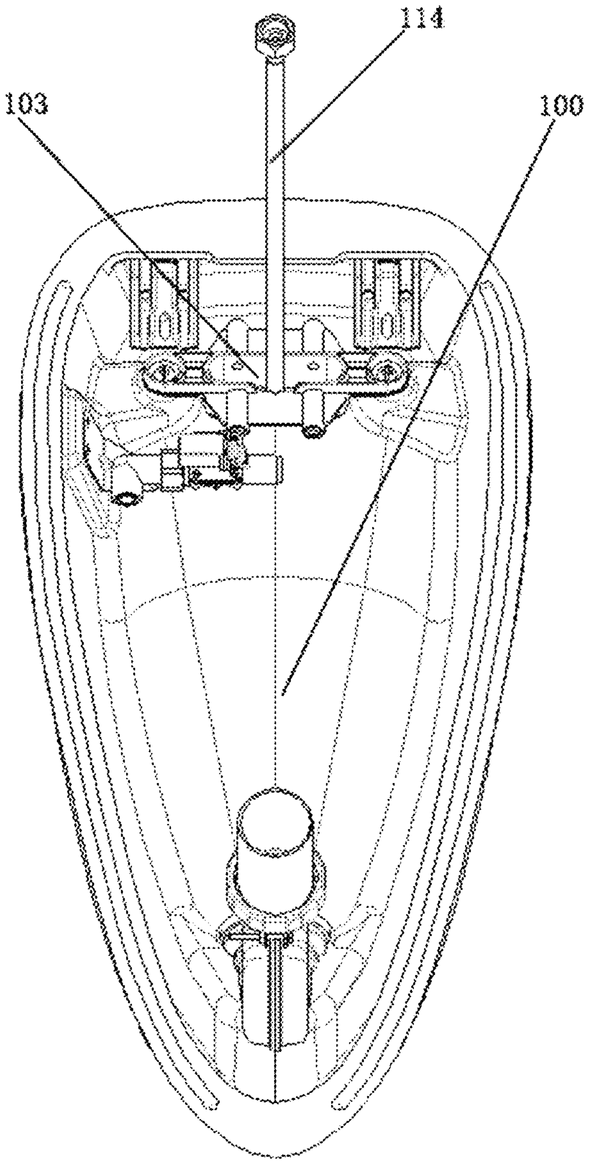
FIG. 2 is a schematic diagram of disassembling the connecting structure according to the first embodiment of the present disclosure.
Figure 3:
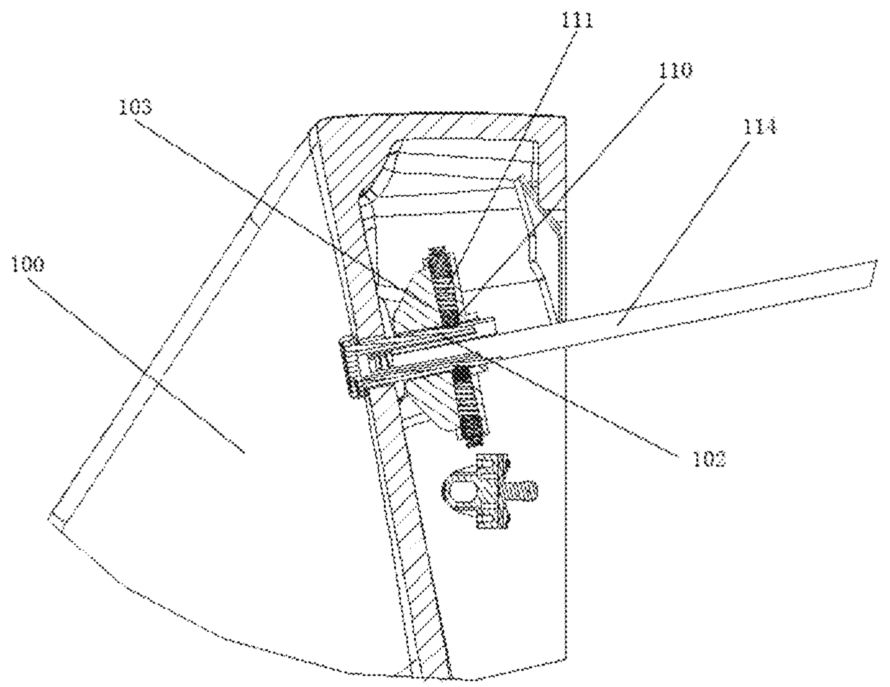
FIG. 3 is a schematic diagram of a side section of the connecting structure according to the first embodiment of the present disclosure.
Figure 4:
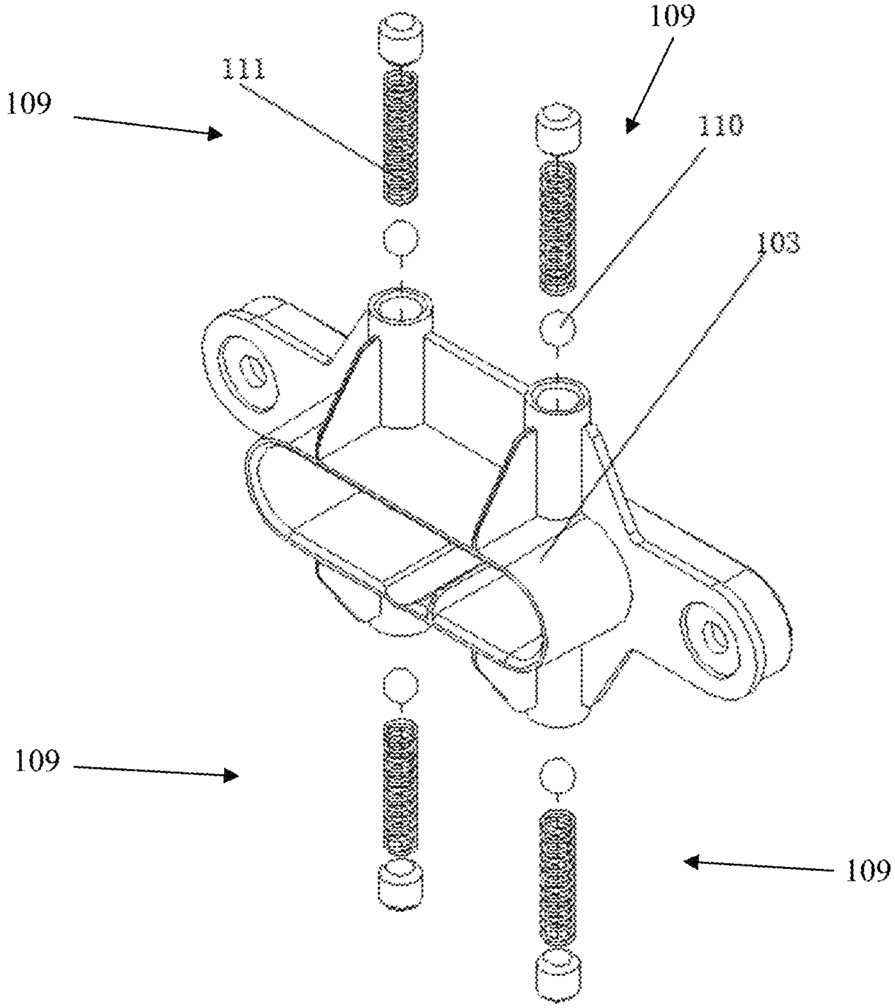
FIG. 4 is an exploded schematic diagram of the connecting structure according to the first embodiment of the present disclosure.
Figure 5:
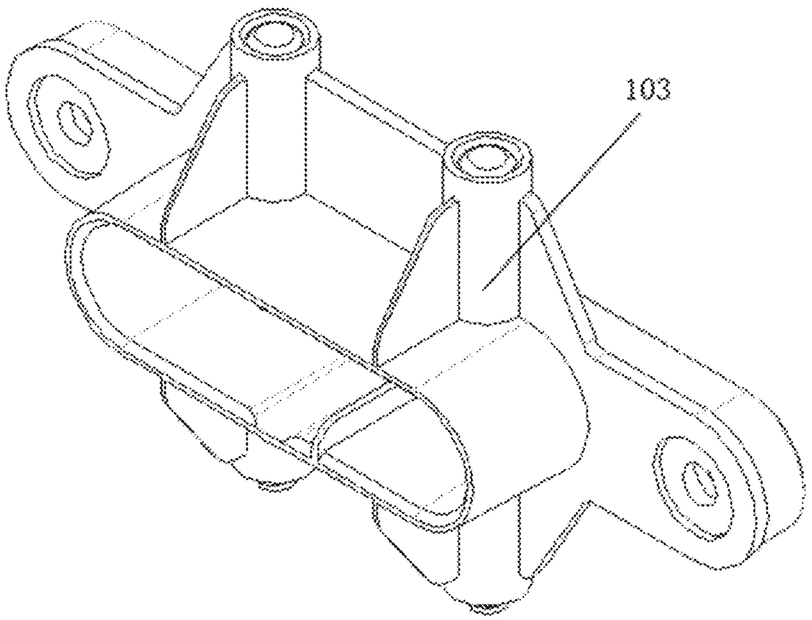
FIG. 5 is a schematic diagram of the connecting structure according to the first embodiment of the present disclosure after being installed.
Figure 9:
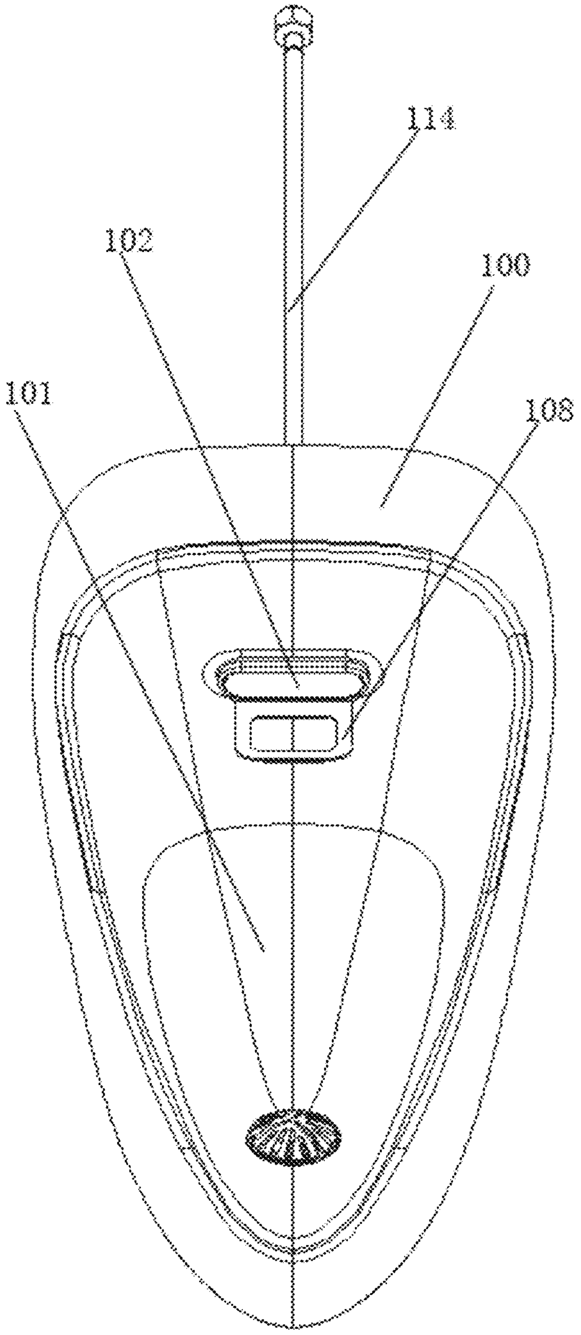
FIG. 9 is a schematic diagram of a step of pulling out a nozzle assembly with a jig according to the first embodiment of the present disclosure.
Figure 10:
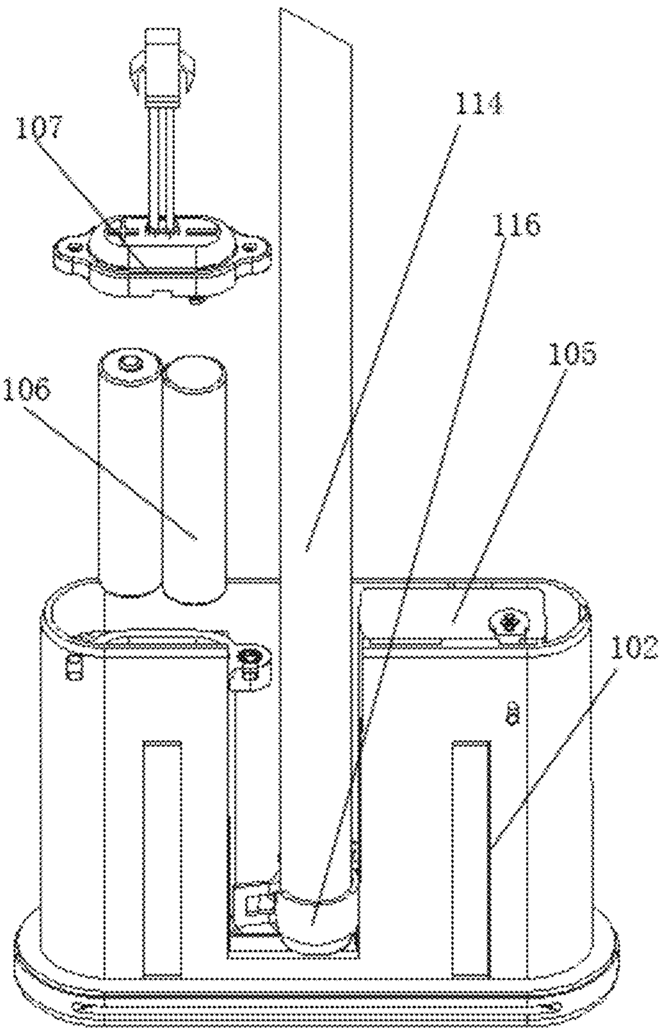
FIG. 10 is a schematic diagram of a step of opening a cover of battery to update the battery according to the first embodiment of the present disclosure.

FIG. 1 is a schematic diagram of a connecting structure according to a first embodiment of the present disclosure. FIG. 2 is a schematic diagram of disassembling the connecting structure according to the first embodiment of the present disclosure. FIG. 3 is a schematic diagram of a side section of the connecting structure according to the first embodiment of the present disclosure. FIG. 4 is an exploded schematic diagram of the connecting structure according to the first embodiment of the present disclosure. FIG. 5 is a schematic diagram of the connecting structure according to the first embodiment of the present disclosure after being installed. FIG. 9 is a schematic diagram of a step of pulling out a nozzle assembly with a jig according to the first embodiment of the present disclosure. FIG. 10 is a schematic diagram of a step of opening a cover of battery to update the battery according to the first embodiment of the present disclosure. Elements shown in other figures may also be included in this embodiment.

As shown in FIGS. 1 and 2, the present disclosure provides a connecting structure applied to a urinal, including: a urinal bowl 100, wherein the urinal bowl 100 is provided with a basin surface 101 for taking urine. When the basin surface 101 is viewed in an up-down direction, a top portion of the basin surface 101 is formed into an arc surface with a larger radius of curvature, and a lower portion of the basin surface 101 is formed into an arc surface with a smaller radius of curvature, and a bottom portion of the basin surface is formed into a bowl-like shape that contracts while bending.

The urinal bowl 100 is provided with a nozzle assembly 102, which can spit out cleaning water to clean the basin surface 101, and the nozzle assembly 102 is connected with a tap water pipe 114 for supplying cleaning water.

Figure 7:
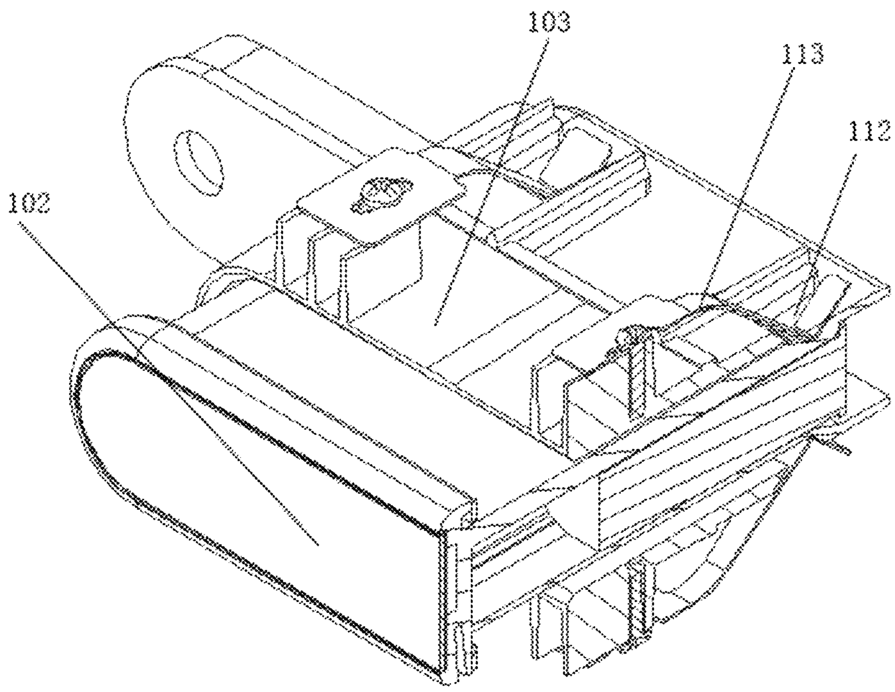
FIG. 7 is a schematic diagram of disassembling a part of the connecting structure according to the second embodiment of the present disclosure.
Figure 8:
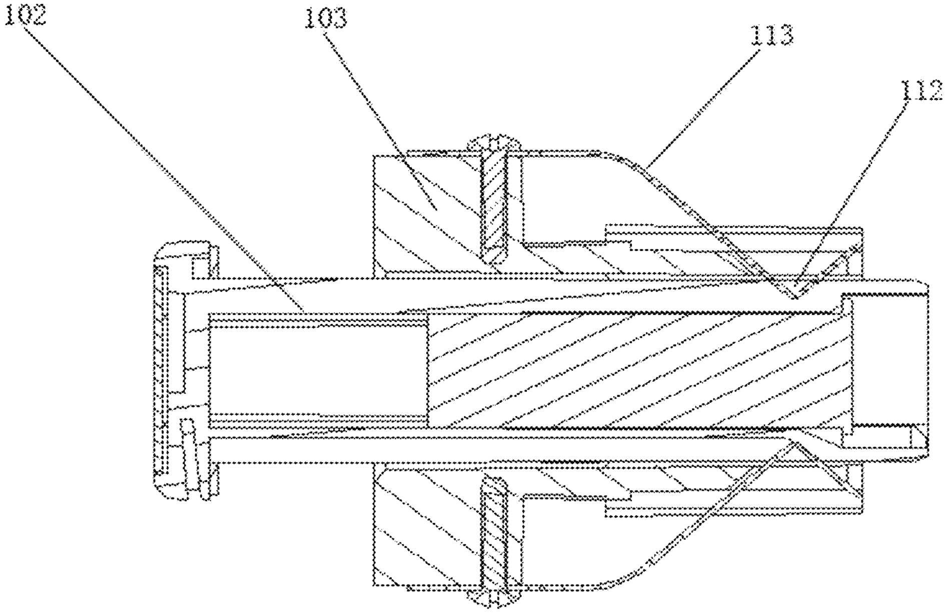
FIG. 8 is a schematic diagram of a side section of the connecting structure according to the second embodiment of the present disclosure.

As shown in FIGS. 1 to 3, a middle upper portion of the urinal bowl 100 is provided with an accommodating space 104, and the nozzle assembly 102 is accommodated in the accommodating space 104. A nozzle bracket 103 is arranged in the accommodating space 104; and the nozzle bracket 103 is movably connected with the nozzle assembly 102. As shown in FIGS. 7 and 8, an electronic control unit 105 and/or a battery 106 is arranged in a shell of the nozzle assembly 102. According to the present disclosure, the electric control unit 105 and/or the battery 106 which often needs maintenance is integrated into one nozzle assembly 102. In addition, the nozzle assembly 102 is movably connected with the nozzle bracket 103 through a locking structure, and then is movably connected with the urinal. In this way, during maintenance, the nozzle assembly 102 can be simply and solely taken out to replace the battery 106 or be repaired on site, or a new nozzle assembly 102 could also be directly replaced and then the damaged nozzle assembly 102 may be brought back for maintenance. In this way, the intelligent urinal can be repaired or the battery 106 can be replaced quickly, so as to reduce maintenance time as far as possible and use of the intelligent urinal is not affected.

As shown in FIGS. 3 to 5, the nozzle bracket 103 is provided with a plurality of locking structures 109 symmetrically arranged on the nozzle bracket 103. In this embodiment, as shown in FIGS. 4 and 5, four symmetrical locking structures are provided. Of course, other number of locking structures may also be provided as required.

As shown in FIG. 4, an inward end of the locking structure 109 is provided with a steel ball 110, the steel ball 110 is connected with a spring 111, and the other end of the spring 111 is fixedly connected to the nozzle bracket 103. Under a pressure of the spring 111, the steel ball 110 protrudes towards the nozzle assembly 102 by a set distance; and a step structure 112 matched with the steel ball 110 is arranged on the shell of the nozzle assembly 102. In this embodiment, the locking structure 109 uses the steel ball 110 to match with a step on the shell of the nozzle assembly 102 and locks the shell of the nozzle assembly 102 by a force of the spring 111.

When the shell of the nozzle assembly 102 needs to be fixed, the nozzle assembly 102 is pushed into the nozzle bracket 103. When the steel ball 110 is clamped with the step, the steel ball 110 is clamped in the step under the pressure of the spring 111 to fix the nozzle assembly 102. When the nozzle assembly 102 needs to be repaired, a jig 108 is used to pull out the nozzle assembly 102, the steel ball 110 is pushed away from the step, and the nozzle assembly 102 is pulled out.

A flushing function of the urinal bowl 100 is triggered by infrared induction/touch/switch. As shown in FIG. 9, if the nozzle assembly 102 of the connecting structure according to the present disclosure needs to be repaired, it is only needed to entirely pull the nozzle assembly 102 out.

An electronic control unit 105 of the nozzle assembly 102 includes an electronic control part connected with a sensor. Cleaning water may be dispensed or spit out to the basin surface 101 according to an induction signal from a body detection sensor, a set control program, and the like. The body detection sensor detects a position of a user. When the user approaches the urinal, a control module of the connecting structure is triggered; when the user leaves, the nozzle assembly 102 spits out the cleaning water to the basin surface 101 according to a trigger signal and/or a set control program, and stops spitting out water according to a trigger signal and/or a set control program. A time for spitting out water or stopping the process may also be set by the user, and the user may also turn off a body sensing function by setting. In this way, no manual control is needed, which is cleaner, saves energy and is close to the needs of the user.

The body detection sensor may include a microwave sensor, an infrared sensor, a visible light sensor and other sensors that can sense a distance and the position of the user. The microwave sensor is a device that uses microwave characteristics to detect some physical quantities, including the existence, moving speed, distance, angle and other information of a sensing object, and a microwave emitted by a transmitting antenna will be absorbed or reflected when meeting the detected object, causing a power to change. If the microwave passing through the detected object or reflected by the detected object is received by a receiving antenna, is converted into an electrical signal, and then processed by a measuring circuit, then microwave detection is realized. The infrared sensor is a sensor that senses the existence, moving speed, distance, angle and other information of the object by using infrared rays.

A maintenance mode of the nozzle assembly 102 of the present disclosure is as follows.

As shown in FIG. 9, during maintenance of the urinal, the nozzle assembly 102 may be pulled out by using the jig 108.

As shown in FIG. 10, after the nozzle assembly 102 is pulled out, a maintenance staff opens a cover of the battery 106 to update the battery 106. If the electric control part of the nozzle assembly 102 is wrong, a screw may be loosened to update the electric control part.

Second Embodiment

Figure 6:
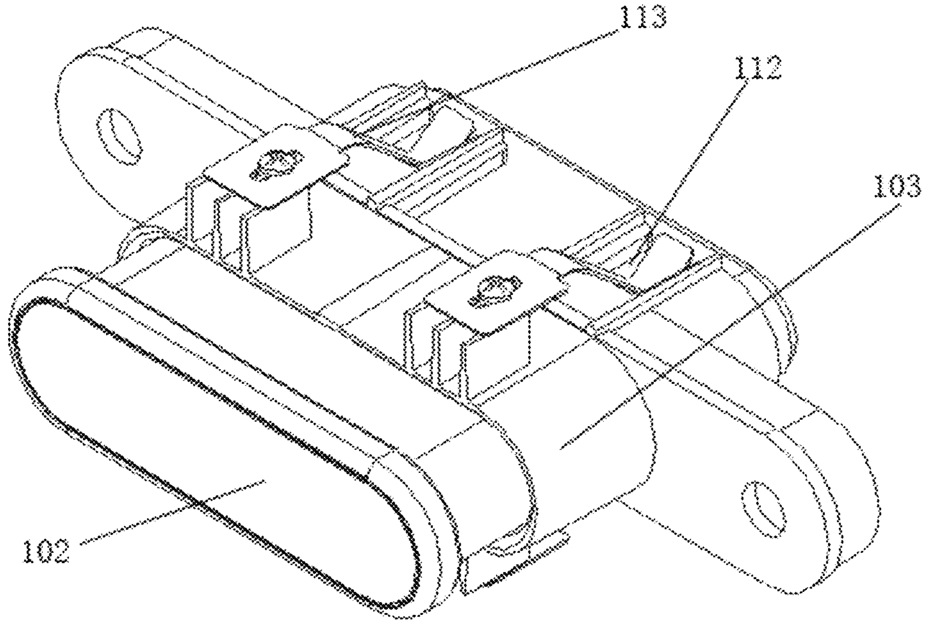
FIG. 6 is a schematic diagram of a connecting structure according to a second embodiment of the present disclosure.

FIG. 6 is a schematic diagram of a connecting structure according to a second embodiment of the present disclosure. FIG. 7 is a schematic diagram of disassembling a part of the connecting structure according to the second embodiment of the present disclosure. FIG. 8 is a schematic diagram of a side section of the connecting structure according to the second embodiment of the present disclosure. Elements shown in other figures may also be included in this embodiment.

As another form of the locking structure, as shown in FIGS. 6 to 8, the locking structure 109 is provided with a spring strip 113, one end of the spring strip 113 is fixedly connected to the nozzle bracket 103, and the other end of the spring strip 113 abuts against the clamping structure on the shell of the nozzle assembly 102.

In this way, when the shell of the nozzle assembly 102 needs to be fixed, the nozzle assembly 102 is pushed into the nozzle bracket 103. When the steel ball 110 is clamped with the step, the nozzle assembly 102 is fixed. When the nozzle assembly 102 needs to be repaired, the jig 108 is used to pull out the nozzle assembly 102, the spring strip 113 is pushed away from the step, and the nozzle assembly 102 is pulled out.

Third Embodiment

Figure 11:
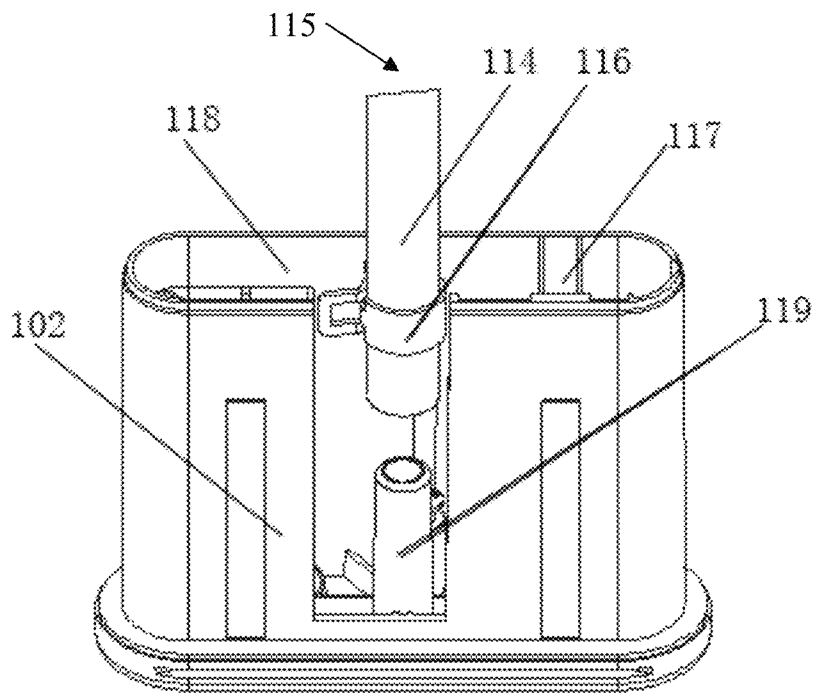
FIG. 11 is a schematic diagram showing connection between a nozzle assembly and a water pipe according to a third embodiment of the present disclosure.
Figure 12:
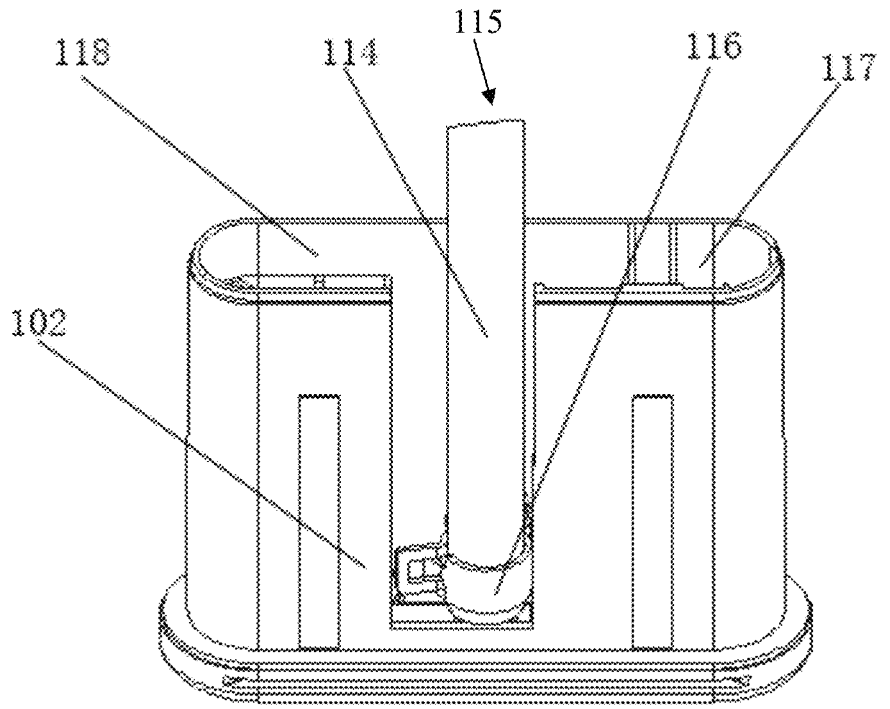
FIG. 12 is a schematic diagram of the nozzle assembly and the water pipe fixed by a clamp according to the third embodiment of the present disclosure.

FIG. 11 is a schematic diagram showing connection between a nozzle assembly and a water pipe according to a third embodiment of the present disclosure. FIG. 12 is a schematic diagram of the nozzle assembly and the water pipe fixed by a clamp according to the third embodiment of the present disclosure. Elements shown in other figures may also be included in this embodiment.

In this embodiment, the present disclosure further provides a nozzle assembly 102 applied to a urinal, wherein the nozzle assembly 102 may be a product that may be sold or used independently from the existing urinal.

As shown in FIGS. 1 to 3, a middle upper portion of the urinal bowl 100 is provided with an accommodating space 104, and the nozzle assembly 102 is accommodated in the accommodating space 104. The nozzle assembly 102 dispenses or spits out cleaning water to the basin surface 101. A nozzle bracket 103 is arranged in the accommodating space 104; and the nozzle bracket 103 is movably connected with the nozzle assembly 102.

As shown in FIGS. 7 and 8, an electronic control unit 105 and/or a battery 106 is arranged in a shell of the nozzle assembly 102. According to the present disclosure, the electric control unit 105 and/or the battery 106 which often needs maintenance is integrated into one nozzle assembly 102. In addition, the nozzle assembly 102 is movably connected to the nozzle bracket 103 through a locking mechanism, and then is movably connected to the urinal. In this way, during maintenance, the nozzle assembly 102 can be simply and solely taken out to replace the battery 106 or be repaired on site, or a new nozzle assembly 102 can be directly replaced, and the damaged nozzle assembly 102 can be brought back for maintenance. In this way, the intelligent urinal can be repaired or the battery 106 can be replaced quickly, so as to reduce maintenance time as far as possible and use of the intelligent urinal is not affected.

As shown in FIGS. 11 and 12, the nozzle assembly 102 is connected with a water pipe 114. A middle portion of the shell is provided with a channel 115 for the water pipe 114 to pass through. A first cavity 117 and a second cavity 118 are symmetrically distributed on left and right sides of the water pipe 114. The water pipe 114 is connected with the nozzle assembly 102 through an elastic clamp 116. The water pipe 114 and the nozzle assembly 102 are connected by the clamp 116, so that the water pipe 114 can be quickly plugged and unplugged, and the nozzle assembly 102 can be conveniently replaced. The water pipe 114 is connected with a water source to provide water for the nozzle assembly 102. When the nozzle assembly 102 needs to be replaced, the clamp 116 is opened and the water pipe 114 is pulled out to separate the water pipe 114 from the nozzle assembly 102. When the nozzle assembly 102 needs to be installed, connection between the water pipe 114 and the nozzle assembly 102 can be completed by inserting the water pipe 114 with a proper diameter into a water inlet 119 of the nozzle assembly and clamping the clamp 116.

Figure 13:
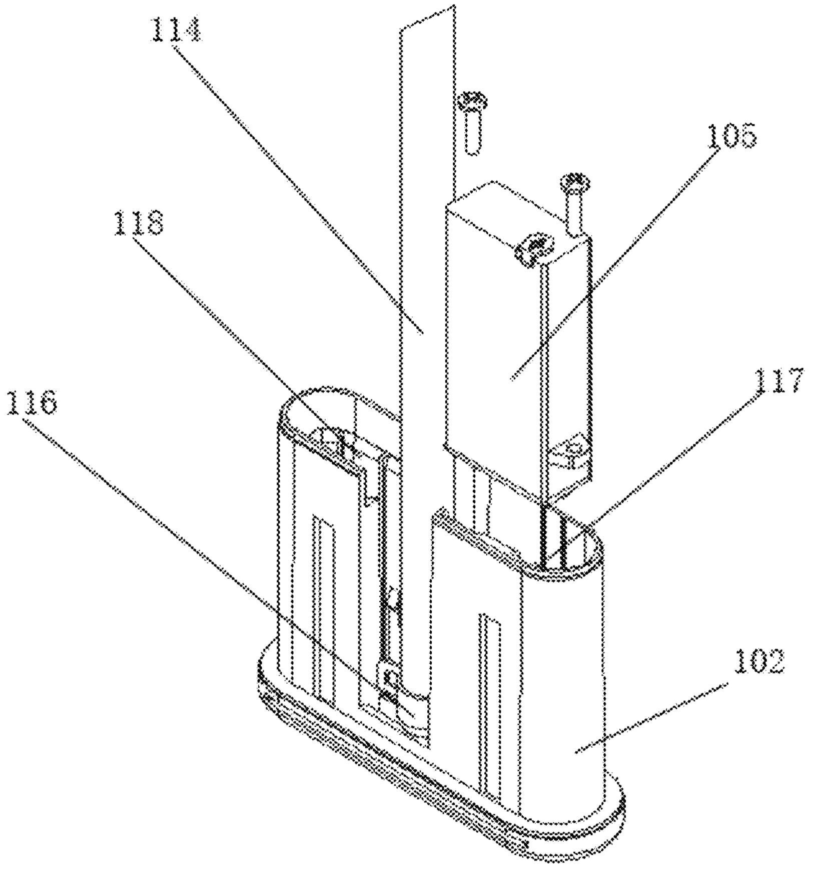
FIG. 13 is a schematic diagram of an electric control unit according to a fourth embodiment of the present disclosure installed at a first cavity.
Figure 14:
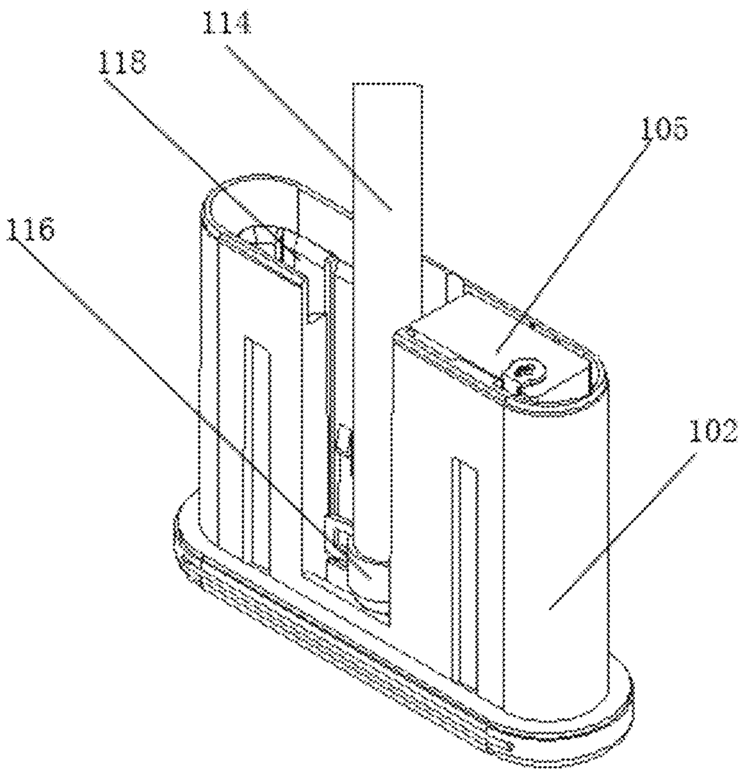
FIG. 14 is a schematic diagram of the electric control unit according to the fourth embodiment of the present disclosure installed in the first cavity.

As shown in FIGS. 13 and 14, the first cavity 117 is arranged in the shell, and an electronic control unit 105 is accommodated in the first cavity 117. The electronic control unit 105 is located in a case of the electronic control unit 105, and the case of the electronic control unit 105 is movably connected with an inner wall of the shell through a slot. The electric control unit 105 is inserted into the first cavity 117. During maintenance, the case of the electric control unit 105 can be simply and solely taken out from the nozzle assembly 102 to repair on site, or a new electronic control unit 105 can be directly replaced, and the electronic control unit 105 may be brought back for maintenance.

Figure 15:
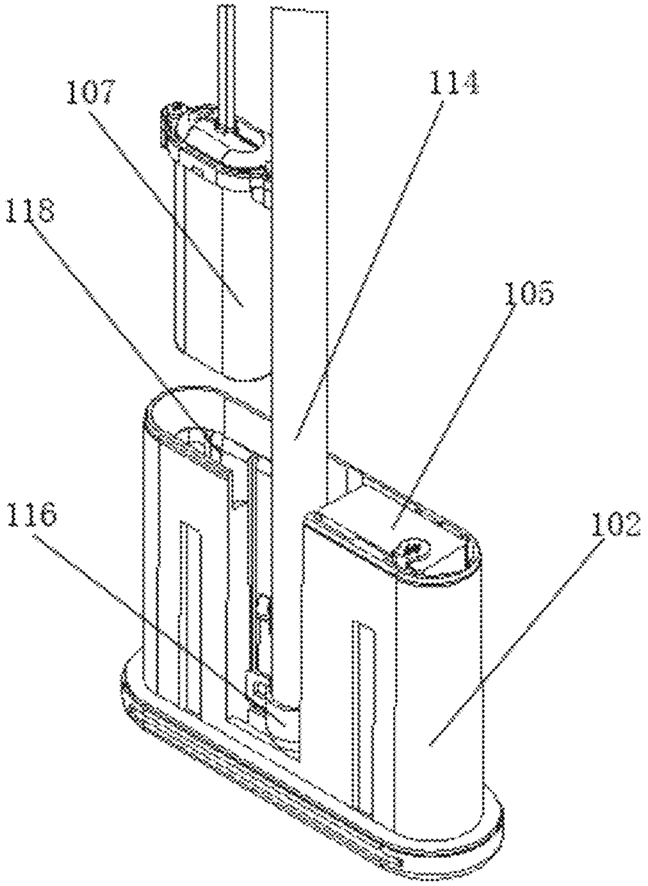
FIG. 15 is a schematic diagram of a battery according to a fifth embodiment of the present disclosure installed at a second cavity.
Figure 16:
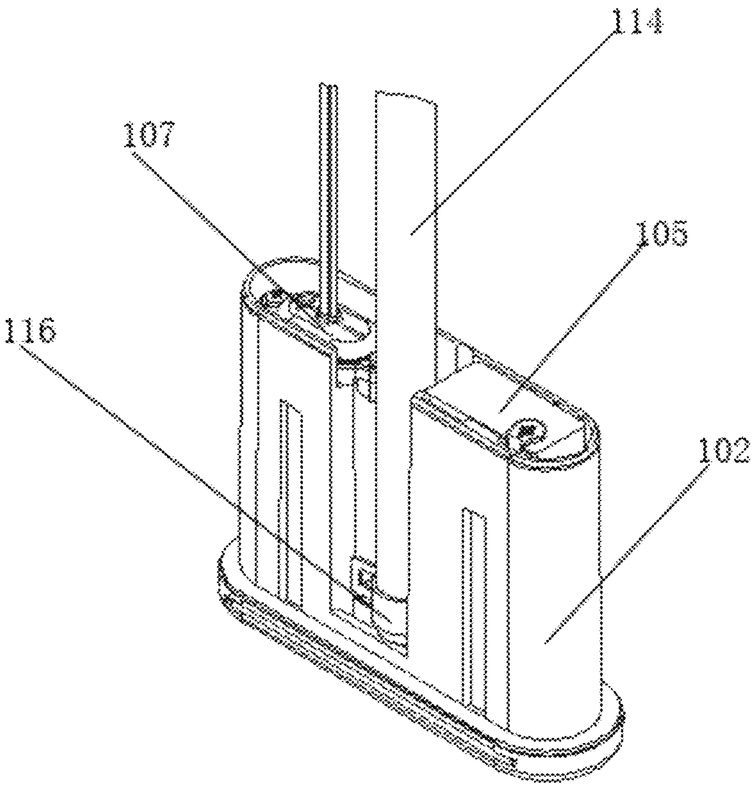
FIG. 16 is a schematic diagram of the battery according to the fifth embodiment of the present disclosure installed in the second cavity.

As shown in FIGS. 15 and 16, the second cavity 118 is arranged in the shell, and a battery 106 is accommodated in the second cavity 118. The battery 106 is located in a battery case 107 in the second cavity 118. The battery case 107 may be movably connected with the inner wall of the shell through a slot, and during replacing, the battery case 107 is replaced together with the battery 106. Alternatively, the battery case 107 may be fixed in the second cavity 118, and only the battery 106 may be replaced. During maintenance, the battery 106 can be simply and solely taken out from the nozzle assembly 102 to be replaced on site.

Fourth Embodiment

FIG. 13 is a schematic diagram of an electric control unit according to a fourth embodiment of the present disclosure installed at a first cavity. FIG. 14 is a schematic diagram of the electric control unit according to the fourth embodiment of the present disclosure installed in the first cavity. Elements shown in other figures may also be included in this embodiment.

The present disclosure further provides a nozzle bracket 103 applied to a urinal, wherein the nozzle bracket 103 may be a product that may be sold or used independently from the existing urinal.

The nozzle bracket 103 is located in an accommodating space 104 on a middle upper portion of a urinal bowl 100; and a nozzle assembly 102 is movably connected in the nozzle bracket 103. The nozzle bracket 103 is provided with a plurality of locking structures 109. An inward end of the locking structure 109 is provided with a steel ball 110, the steel ball 110 is connected with a spring 111, and the other end of the spring 111 is fixedly connected to the nozzle bracket 103. Under a pressure of the spring 111, the steel ball 110 protrudes towards the nozzle assembly 102 by a set distance; and a clamping structure matched with the steel ball 110 is arranged on the shell of the nozzle assembly 102. In an embodiment, a plurality of groups of the locking structure 109 are arranged symmetrically on the nozzle bracket 103. A plurality of the locking structures 109 may also be provided, which use the steel ball 110 to match with a step on the shell of the nozzle assembly 102 and lock the shell of the nozzle assembly 102. The nozzle bracket 103 according to the present disclosure enables the nozzle assembly 102 of the urinal to be replaced and maintained conveniently and quickly.

Fifth Embodiment

FIG. 15 is a schematic diagram of a battery according to a fifth embodiment of the present disclosure installed at a second cavity. FIG. 16 is a schematic diagram of the battery according to the fifth embodiment of the present disclosure installed in the second cavity. Elements shown in other figures may also be included in this embodiment.

The present disclosure further provides a nozzle bracket 103 applied to a urinal, wherein the nozzle bracket 103 may be a product that may be sold or used independently from the existing urinal.

The nozzle bracket 103 is located in an accommodating space 104 on a middle upper portion of a urinal bowl 100; and a nozzle assembly 102 is movably connected in the nozzle bracket 103. The nozzle bracket 103 is provided with a plurality of locking structures 109. As shown in FIGS. 6 to 8, the locking structure 109 is provided with a spring strip 113, one end of the spring strip 113 is fixedly connected to the nozzle bracket 103; and the other end of the spring strip 113 abuts against the clamping structure on the shell of the nozzle assembly 102. In this way, when the shell of the nozzle assembly 102 needs to be fixed, the nozzle assembly 102 is pushed into the nozzle bracket 103. When the steel ball 110 is clamped with the step, the nozzle assembly 102 is fixed. When the nozzle assembly 102 needs to be repaired, the jig 108 is used to pull out the nozzle assembly 102, the spring strip 113 is pushed away from the step, and the nozzle assembly 102 is pulled out.

Sixth Embodiment

Elements shown in the figures discussed above may be included in this embodiment. As shown in FIGS. 1 to 3, the present disclosure further provides a urinal, including: a urinal bowl 100, wherein the urinal bowl 100 is provided with a basin surface 101 for taking urine. When the basin surface 101 is viewed in an up-down direction, a top portion of the basin surface is formed into an arc surface with a larger radius of curvature, and a lower portion of the basin surface is formed into an arc surface with a smaller radius of curvature, and a bottom portion of the basin surface is formed into a bowl-like shape that contracts while bending. A nozzle assembly 102 is arranged above the urinal bowl 100, which can dispense or spit out cleaning water to clean the basin surface 101, and the nozzle assembly 102 is connected with a tap water pipe 114 for supplying cleaning water.

As shown in FIGS. 1 to 3, a middle upper portion of the urinal bowl 100 is provided with an accommodating space 104, and the nozzle assembly 102 is accommodated in the accommodating space 104. A nozzle bracket 103 is arranged in the accommodating space 104; and the nozzle bracket 103 is movably connected with the nozzle assembly 102. As shown in FIGS. 7 and 8, an electronic control unit 105 and/or a battery 106 is arranged in a shell of the nozzle assembly 102. According to the present disclosure, the electric control unit 105 and/or the battery 106 which often needs maintenance is integrated into one nozzle assembly 102. In addition, the nozzle assembly 102 is movably connected to the nozzle bracket 103 through a locking mechanism, and then is movably connected to the urinal. In this way, during maintenance, the nozzle assembly 102 can be simply and solely taken out to replace the battery 106 or be repaired on site, or a new nozzle assembly 102 can be directly replaced, and the damaged nozzle assembly 102 can be brought back for maintenance. In this way, the intelligent urinal can be repaired or the battery 106 can be replaced quickly, so as to reduce maintenance time as far as possible and use of the intelligent urinal is not affected.

As shown in FIGS. 3 to 5, the nozzle bracket 103 is provided with a plurality of locking structures 109 symmetrically arranged on the nozzle bracket 103. In this embodiment, as shown in FIGS. 4 and 5, four symmetrical locking structures are provided. Of course, other number of locking structures may also be provided as required.

As shown in FIG. 4, an inward end of the locking structure 109 is provided with a steel ball 110, the steel ball 110 is connected with a spring 111, and the other end of the spring 111 is fixedly connected to the nozzle bracket 103. Under a pressure of the spring 111, the steel ball 110 protrudes towards the nozzle assembly 102 by a set distance; and a clamping structure matched with the steel ball 110 is arranged on the shell of the nozzle assembly 102. In this embodiment, the locking structure 109 uses the steel ball 110 to match with a step on the shell of the nozzle assembly 102 and locks the shell of the nozzle assembly 102 by a force of the spring 111. When the shell of the nozzle assembly 102 needs to be fixed, the nozzle assembly 102 is pushed into the nozzle bracket 103. When the steel ball 110 is clamped with the step, the steel ball 110 is clamped in the step under the pressure of the spring 111 to fix the nozzle assembly 102. When the nozzle assembly 102 needs to be repaired, a jig 108 is used to pull out the nozzle assembly 102, the steel ball 110 is pushed away from the step, and the nozzle assembly 102 is pulled out.

As another form of the locking structure, as shown in FIGS. 6 to 8, the locking structure 109 is provided with a spring strip 113, one end of the spring strip 113 is fixedly connected to the nozzle bracket 103, and the other end of the spring strip 113 abuts against the clamping structure on the shell of the nozzle assembly 102. In this way, when the shell of the nozzle assembly 102 needs to be fixed, the nozzle assembly 102 is pushed into the nozzle bracket 103. When the steel ball 110 is clamped with the step, the nozzle assembly 102 is fixed. When the nozzle assembly 102 needs to be repaired, the jig 108 is used to pull out the nozzle assembly 102, the spring strip 113 is pushed away from the step, and the nozzle assembly 102 is pulled out.

A flushing function of the urinal bowl 100 is triggered by infrared induction/touch/switch. As shown in FIG. 9, if the nozzle assembly 102 of the connecting structure according to the present disclosure needs to be repaired, it is only needed to entirely pull the nozzle assembly 102 out.

An electronic control unit 105 of the nozzle assembly 102 includes an electronic control part connected with a sensor. Cleaning water may be dispensed or spit out to the basin surface 101 according to an induction signal from a body detection sensor (not shown), a set control program, and the like. The body detection sensor detects a position of a user. When the user approaches the urinal, a control module of the connecting structure is triggered; when the user leaves, the nozzle assembly 102 spits out the cleaning water to the basin surface 101 according to a trigger signal and/or a set control program, and stops dispensing or spitting out water according to a trigger signal and/or a set control program. A time for dispensing or spitting out water or stopping the process may also be set by the user, and the user may also turn off a body sensing function by setting. In this way, no manual control is needed, which is cleaner, saves energy and is close to the needs of the user.

The body detection sensor may include a microwave sensor, an infrared sensor, a visible light sensor and other sensors that can sense a distance and the position of the user. The microwave sensor is a device that uses microwave characteristics to detect some physical quantities, including the existence, moving speed, distance, angle and other information of a sensing object, and a microwave emitted by a transmitting antenna will be absorbed or reflected when meeting the detected object, causing a power to change. If the microwave passing through the detected object or reflected by the detected object is received by a receiving antenna, is converted into an electrical signal, and then processed by a measuring circuit, then microwave detection is realized. The infrared sensor is a sensor that senses the existence, moving speed, distance, angle and other information of the object by using infrared rays.

A maintenance mode of the nozzle assembly 102 of the present disclosure is as follows.

As shown in FIG. 9, during maintenance of the urinal, the nozzle assembly 102 may be pulled out by using the jig 108.

As shown in FIG. 10, after the nozzle assembly 102 is pulled out, a maintenance staff opens a cover of the battery 106 to update the battery 106. If the electric control part of the nozzle assembly 102 is wrong, a screw could be loosened to update the electric control part.

As shown in FIGS. 11 and 12, the nozzle assembly 102 is connected with a water pipe 114. A middle portion of the shell is provided with a channel 115 for the water pipe 114 to pass through. A first cavity 117 and a second cavity 118 are symmetrically distributed on left and right sides of the water pipe 114. The water pipe 114 is connected with the nozzle assembly 102 through an elastic clamp 116. The water pipe 114 and the nozzle assembly 102 are connected by the clamp 116, so that the water pipe 114 could be quickly plugged and unplugged, and the nozzle assembly 102 could be conveniently replaced. The water pipe 114 is connected with a water source to provide water for the nozzle assembly 102. When the nozzle assembly 102 needs to be replaced, the clamp 116 is opened and the water pipe 114 is pulled out to separate the water pipe 114 from the nozzle assembly 102. When the nozzle assembly 102 needs to be installed, connection between the water pipe 114 and the nozzle assembly 102 can be completed by inserting the water pipe 114 with a proper diameter into a water inlet 119 of the nozzle assembly and clamping the clamp 116.

As shown in FIGS. 13 and 14, the first cavity 117 is arranged in the shell, and an electronic control unit 105 is accommodated in the first cavity 117. The electronic control unit 105 is located in a case of the electronic control unit 105, and the case of the electronic control unit 105 is movably connected with an inner wall of the shell through a slot. The electric control unit 105 is inserted into the first cavity 117. During maintenance, the case of the electric control unit 105 could be simply and solely taken out from the nozzle assembly 102 to be repaired on site, or a new electronic control unit 105 could be directly replaced, and the electronic control unit 105 may be brought back for maintenance.

As shown in FIGS. 15 and 16, the second cavity 118 is arranged in the shell, and a battery 106 is accommodated in the second cavity 118. The battery 106 is located in a battery case 107 in the second cavity 118. The battery case 107 may be movably connected with the inner wall of the shell through a slot, and during replacing, the battery case 107 is replaced together with the battery 106. Alternatively, the battery case 107 may be fixed in the second cavity 118, and only the battery 106 may be replaced. During maintenance, the battery 106 can be simply and solely taken out from the nozzle assembly 102 to be replaced on site.

In a nutshell, the present disclosure provides a connecting structure, a nozzle assembly, a nozzle bracket and a urinal, and the connecting structure includes: a urinal bowl, wherein the urinal bowl is provided with a basin surface for taking urine, a middle upper portion of the urinal bowl is provided with an accommodating space, and the nozzle assembly is accommodated in the accommodating space; the nozzle bracket is arranged in the accommodating space; the nozzle bracket is movably connected with the nozzle assembly; and the nozzle bracket is provided with a locking structure. The connecting structure according to the present disclosure enables the nozzle assembly of the urinal to be replaced and maintained conveniently and quickly.

The present disclosure also provides a nozzle assembly and a urinal, wherein the nozzle assembly is located in an accommodating space in a middle upper portion of the urinal, and the nozzle assembly is movably connected with the urinal through a nozzle bracket; and the nozzle assembly includes: a shell, wherein an electric control unit and/or a battery is arranged in the shell; and the nozzle assembly is movably connected with the nozzle bracket. The nozzle assembly according to the present disclosure becomes a whole with the battery and the electric control unit integrated inside, and the nozzle assembly is movably connected with the urinal, which can be replaced and maintained conveniently and quickly.

The controller (e.g. the electronic control unit 105) can be implemented by any appliances. The controller may include a processor, a memory, and a communication interface for interfacing with the devices as discussed in the present disclosure. The components of the controller may communicate using bus. The controller may be connected to a workstation or another external device (e.g., control panel, remote) and/or a database for receiving user inputs, system characteristics, and any of the values described herein. Optionally, the controller may include an input device and/or a sensing circuit in communication with any of the sensors. The sensing circuit receives sensor measurements from as described above. Optionally, the controller may include a drive unit for receiving and reading non-transitory computer media having instructions. Additional, different, or fewer components may be included. The processor is configured to perform instructions stored in memory for executing the algorithms described herein.

Processor may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

Memory may include one or more devices (e.g., memory units, memory devices, storage devices, etc.) for storing data and/or computer code for completing and/or facilitating the various processes described in the present disclosure. Memory may include random access memory (RAM), read-only memory (ROM), hard drive storage, temporary storage, non-volatile memory, flash memory, optical memory, or any other suitable memory for storing software objects and/or computer instructions. Memory may include database components, object code components, script components, or any other type of information structure for supporting the various activities and information structures described in the present disclosure. Memory may be communicably connected to processor via a processing circuit and may include computer code for executing (e.g., by processor) one or more processes described herein. For example, memory may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface. The communication interface may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The present disclosure is not limited to the embodiments discussed above. The above description of the specific embodiments is intended to describe and explain the technical solutions of the present disclosure. Obvious transformation or substitution based on the revelation of the present disclosure should also be considered as falling into the protection scope of the present disclosure. The above specific embodiments are used to reveal the best implementation method of the present disclosure, so that those of ordinary skills in the art could apply various embodiments and alternative ways of the present disclosure to achieve the purpose of the present disclosure.

I claim:

1. A connecting structure, comprising:

a urinal bowl comprising a basin surface configured to receive urine, wherein a middle upper portion of the urinal bowl is provided with an accommodating space and a nozzle assembly is accommodated in the accommodating space, wherein a nozzle bracket is arranged in the accommodating space, wherein the nozzle bracket is movably connected with the nozzle assembly via a locking structure, wherein the nozzle bracket is provided with the locking structure, wherein the locking structure comprises a steel ball or a spring strip matched with a step structure disposed on a shell of the nozzle assembly to lock the nozzle assembly, wherein a first end of the spring strip is fixedly connected to the nozzle bracket, and wherein a second end of the spring strip abuts against the step structure disposed on the shell of the nozzle assembly.

2. The connecting structure according to claim 1, wherein the steel ball is disposed at an inward end of the locking structure, the steel ball is connected with a first end of a spring, and a second end of the spring is fixedly connected to the nozzle bracket, and wherein under a pressure of the spring, the steel ball protrudes towards the nozzle assembly by a set distance.

3. The connecting structure according to claim 1, wherein a plurality of groups of the locking structure are disposed symmetrically on the nozzle bracket.

4. A nozzle assembly for a urinal bowl, the urinal bowl comprising a middle upper portion, wherein the nozzle assembly is located in an accommodating space in the middle upper portion of the urinal bowl and the nozzle assembly is configured to spit out cleaning water to a basin surface, wherein the nozzle assembly is movably connected with a nozzle bracket in the accommodating space, wherein the nozzle bracket is provided with a locking structure, wherein the nozzle assembly comprises a step structure disposed on a shell of the nozzle assembly, wherein the locking structure comprises a steel ball or a spring strip to lock the nozzle assembly matched with the step structure disposed on the shell of the nozzle assembly to lock the nozzle assembly, wherein a first end of the spring strip is fixedly connected to the nozzle bracket, and wherein a second end of the spring strip abuts against the step structure disposed on the shell of the nozzle assembly.

5. The nozzle assembly according to claim 4, wherein an electric control unit and/or a battery are arranged in the shell, and wherein the shell is movably connected with the nozzle bracket through the locking structure.

6. The nozzle assembly according to claim 5, wherein the nozzle assembly is connected with a water pipe.

7. The nozzle assembly according to claim 6, wherein a first cavity is disposed in the shell and the electric control unit is disposed in the first cavity, wherein the electric control unit is located in a case of the electric control unit and the case of the electric control unit is movably connected with an inner wall of the shell, wherein a second cavity is disposed in the shell and the battery is disposed in the second cavity, and wherein the battery is disposed in a battery case and the battery case is movably connected with the inner wall of the shell.

8. The nozzle assembly according to claim 7, wherein a middle portion of the shell comprises a channel for the water pipe to pass through, and wherein the first cavity and the second cavity are symmetrically distributed on left and right sides of the water pipe.

9. A urinal, comprising:

a urinal bowl comprising a basin surface configured to receive urine;

an accommodating portion at a middle upper portion of the urinal bowl, wherein the accommodating portion comprises an accommodating space;

a nozzle assembly disposed in the accommodating space including a nozzle bracket movably connected with the nozzle assembly; and a locking structure disposed on the nozzle bracket, wherein the locking structure comprises a steel ball or a spring strip matched with a step structure disposed on a shell of the nozzle assembly to lock the nozzle assembly, wherein a first end of the spring strip is fixedly connected to the nozzle bracket, and wherein a second end of the spring strip abuts against the step structure disposed on the shell of the nozzle assembly.

10. The urinal according to claim 9, wherein the locking structure further comprises a spring, wherein the steel ball disposed at an inward end of the locking structure, wherein the steel ball is connected with a first end of the spring and a second end of the spring is fixedly connected to the nozzle bracket, wherein under a pressure of the spring, the steel ball protrudes towards the nozzle assembly by a set distance, and wherein the step structure disposed on the shell of the nozzle assembly is matched with the steel ball.

11. The urinal according to claim 9, wherein a plurality of groups of the locking structure are disposed symmetrically on the nozzle bracket.

12. The urinal according to claim 11, further comprising an electric control unit and/or a battery disposed in the shell of the nozzle assembly.

13. The urinal according to claim 12, wherein the nozzle assembly is connected with a water pipe, wherein the shell of the nozzle assembly comprises a first cavity and a second cavity, wherein the electric control unit is disposed in the first cavity, wherein the electric control unit is located in a case of the electric control unit and the case of the electric control unit is movably connected with an inner wall of the shell of the nozzle assembly, wherein the battery is disposed in the second cavity, and wherein the battery is located in a battery case and the battery case is movably connected with the inner wall of the shell of the nozzle assembly.

14. The urinal according to claim 13, wherein the shell of the nozzle assembly further comprises a middle portion including a channel for the water pipe to pass through, and wherein the first cavity and the second cavity are symmetrically distributed on left and right sides of the water pipe.

15. The urinal according to claim 14, wherein the water pipe is connected with the nozzle assembly through an elastic clamp, wherein the electric control unit is inserted into the first cavity, and wherein the battery is inserted into the second cavity.

* * * * *